Dec. 3, 1963 A. E. LUETZOW 3,112,586
METHOD AND APPARATUS FOR FORMING A COVERING ABOUT A GARMENT
Filed Feb. 6, 1956 4 Sheets-Sheet 2
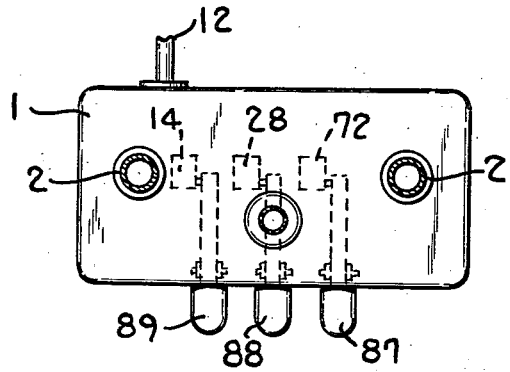
FIG. 3
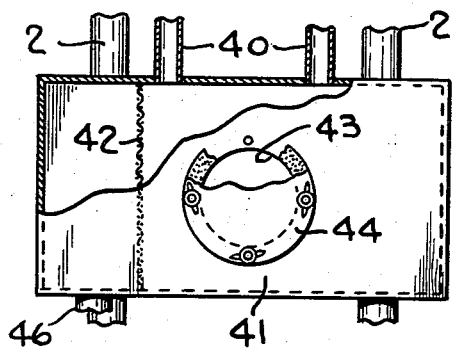
FIG. 4
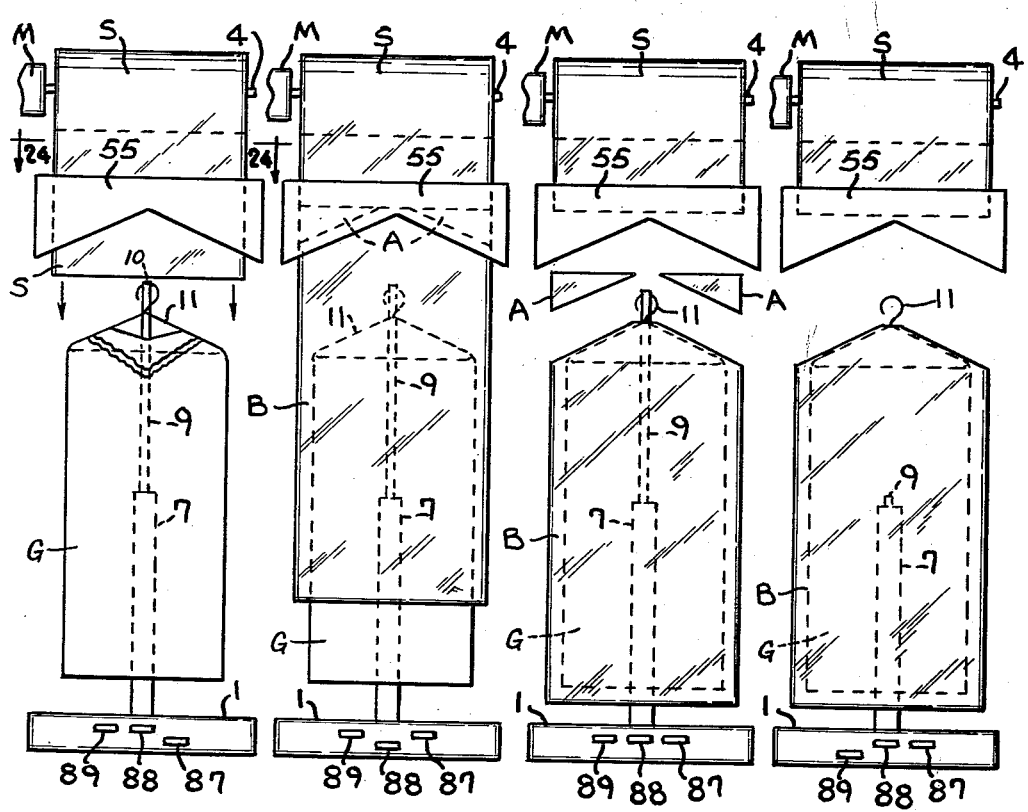
FIG. 12  FIG. 13  FIG. 14  FIG. 15
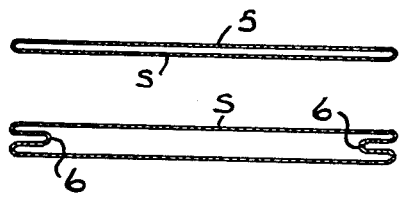
FIG. 24
FIG. 25
INVENTOR.
Albert E. Luetzow
BY
Louis O. French
Atty.

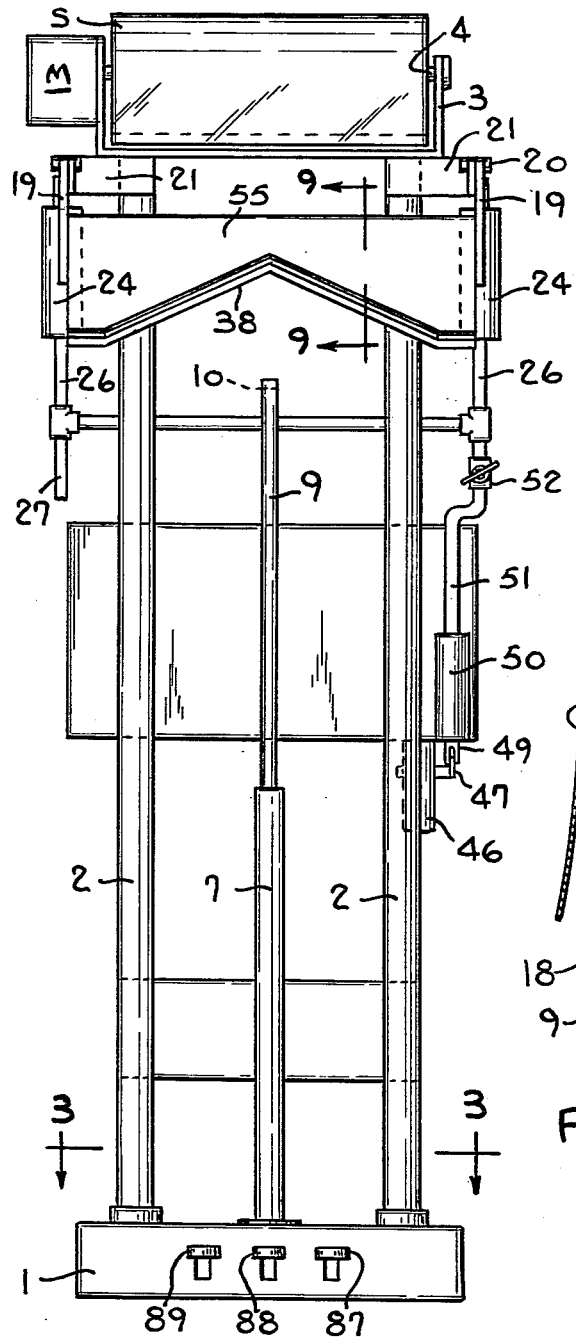

INVENTOR.
Albert E. Luetzow
BY
Louis O. French
Atty

United States Patent Office 3,112,586
Patented Dec. 3, 1963

3,112,586
METHOD AND APPARATUS FOR FORMING A COVERING ABOUT A GARMENT
Albert E. Luetzow, 2121 S. Kinnickinnic Ave., Milwaukee 7, Wis.
Filed Feb. 6, 1956, Ser. No. 563,556
14 Claims. (Cl. 53—29)

The invention relates to an apparatus for the heat cutting of thermoplastic tubular stock and also to apparatus for forming a garment covering bag from a web of such stock drawn from a roll thereof.

Heretofore in cutting through a flattened web of thermoplastic tubular stock by means of a heated wire, the passage of the wire through the stock usually sealed the tube shut where it was cut. One object of the present invention is to provide an apparatus of the character described wherein each side or half of the web of tubular stock is separately cut so that the end of the tube thus cut is left open after the cutting operation.

A further object of this invention is to provide an apparatus for forming a garment bag from a web of tubular thermoplastic stock drawn from a roll thereof, wherein the bag is formed directly after the tubular web is drawn down over the garment to be covered, by heat sealing means so disposed and so constructed that the tubular stock is sealed shut at opposite sides of an unsealed central hanger receiving portion, preferably along downwardly sloping lines corresponding to the shoulders of the garment, while at the same time the formed bag is severed from the rest of the stock but without sealing shut the end of the tubular stock.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed in accordance with the best mode so far devised for the practical application of the principles thereof, and in which:

FIG. 1 is a front elevation view of an apparatus embodying the invention;

FIG. 2 is a side elevation view of the apparatus;

FIG. 3 is a horizontal sectional view taken on the line 3—3 of FIG. 1;

FIG. 4 is an elevation view, partly in section, of the waste receptacle;

Figure 22:
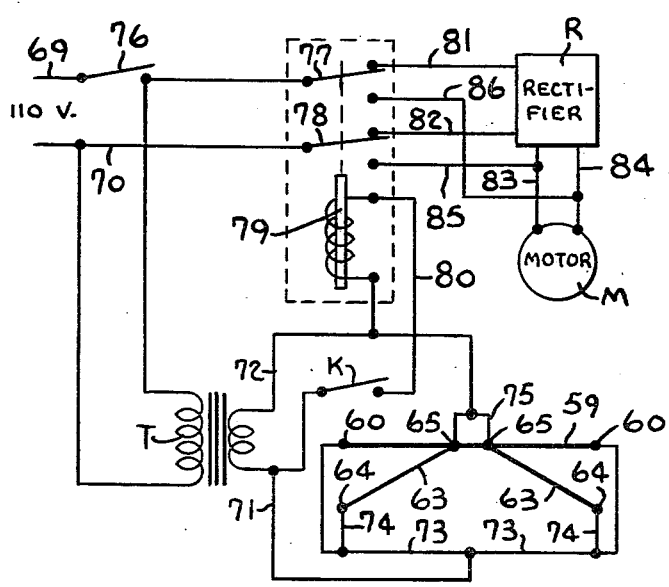
Figure 23:
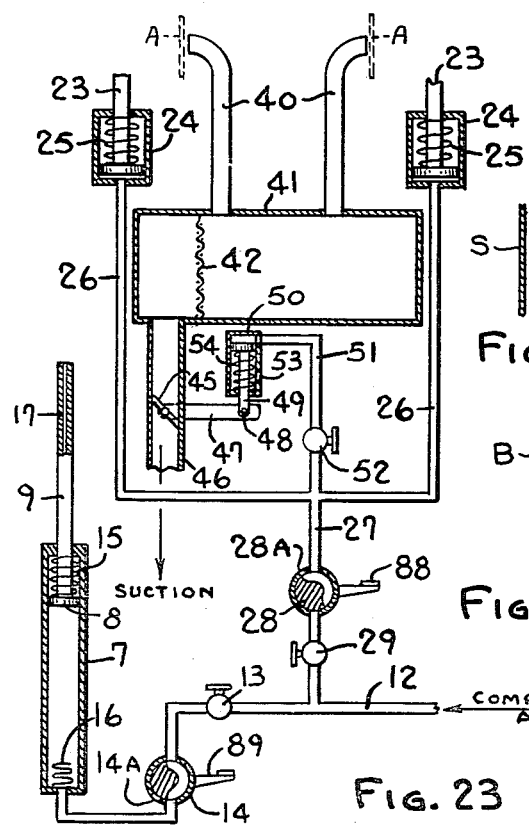
Figures 17, 26:
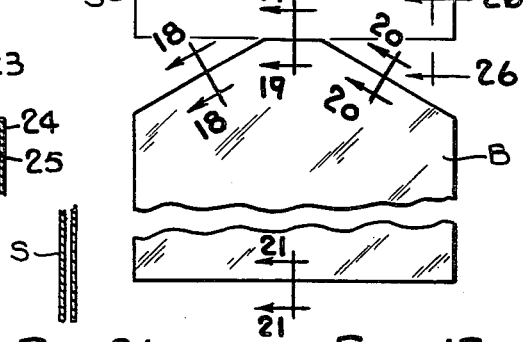
Figures 18, 19, 20, 21:
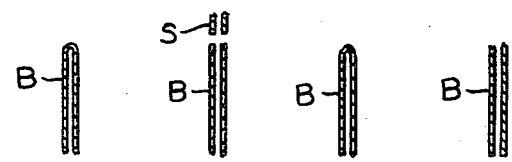

FIGS. 12, 13, 14, and 15 are diagrammatic views showing the various steps of forming the bag;

FIG. 16 is a detailed vertical sectional view of the upper end of the garment support;

FIG. 17 is a composite front elevation view of the upper end of the bag and the lower end of the stock, parts being broken away;

FIG. 18 is a vertical sectional view taken on the line 18—18 of FIG. 17, parts being broken away;

FIG. 19 is a vertical sectional view taken on the line 19—19 of FIG. 17;

FIG. 20 is a vertical sectional view taken on the line 20—20 of FIG. 17;

FIG. 21 is a vertical sectional view taken on the line 21—21 of FIG. 17;

FIG. 22 is a wiring diagram;

FIG. 23 is a power application diagram;

FIG. 24 is a cross sectional view taken in a horizontal plane through one form of tubular stock material;

FIG. 25 is a cross sectional view taken in a horizontal plane through another form of tubular stock material;

FIG. 26 is a vertical sectional view taken on the line 26—26 of FIG. 17.

Although the cutting structure for cutting tubular thermoplastic material in accordance with this invention can be used on such material irrespective of the use of this material as a bag, it will be described in connection with bag forming apparatus.

Referring to FIGS. 1 and 2 of the drawings, the apparatus includes a base 1, vertically disposed spaced standards 2 mounted on the base and carrying a yoke 3 in which an arbor roll or stock roll shaft 4 is detachably mounted, said shaft having a suitable detachable connection with the drive shaft of an electric motor M mounted on one of the arms of said yoke.

The stock S, which is supported on the shaft 4, is of thermoplastic material formed as a continuous tube 5 (FIG. 24) or a continuous tube with gussetted edges 6 as shown in FIG. 25. This stock material may be of extruded polyethylene or other suitable plastic.

A garment support is mounted on a base 1 and comprises an air cylinder 7 (FIGS. 1 and 2) and a piston 8 (see FIG. 23) working in this cylinder and having a rod extension 9 provided with a notched upper end 10 (FIG. 16) to receive a hanger 11 (FIG. 12). The cylinder 7 is adapted to receive compressed air through a supply pipe 12 (FIG. 23) provided with an adjustable throttling valve 13 and a foot operated cut off valve 14, to effect elevation of the piston, and preferably cushioning springs 15 and 16 are provided to cushion the stopping of the piston as it reaches the limits of its ascent and descent. The valve 14 has an opening 14a in its housing for venting the cylinder 7 in the closed position of said valve.

The piston 8 and the piston rod 9 have a passage 17 extending therethrough and provided with a bleed orifice 18 from which, in the raised position of the rod, a jet of air issues to separate the sides of the tubular material as shown in FIG. 16. The orifice 18 also permits the piston to descend by gravity when the cut off valve 14 is operated to close off the cylinder from the compressed air source. Obviously, of course, before the piston reaches its lowermost position shown in FIG. 15, the covered garment draped on its hanger is removed.

The throttling valve 13 determines the rate at which compressed air is furnished to the cylinder 7 and hence the rate at which the piston rod ascends.

The cutting apparatus of this invention includes the stationary part shown in FIG. 5 which is mounted on the standards 2 below the roll of tubular plastic material and a cooperative movable part shown in FIG. 6. This movable part has triangularly shaped plates 19 at its ends pivotally connected at one corner thereof and by pins 20 to bracket arms 21 fixed to the standards and pivotally connected at another corner by pins 22 to pistons 23 operating in cylinders 24. The pistons are biased downwardly by springs 25 and are raised by compressed air fed to the cylinders 24 through branch pipes 26 connected with a common pipe 27 that leads from the supply pipe 12 and has an air supply valve 28 and an adjustable throttling valve 29 therein (see FIG. 23). Adjustment of the throttling valve 29 determines the timing and rate of the movement of the movable part of the cutter. The cylinders 24 are vented in the closed position of the valve 28 through an opening 28A in the housing of said valve, see FIG. 23.

Figure 5:
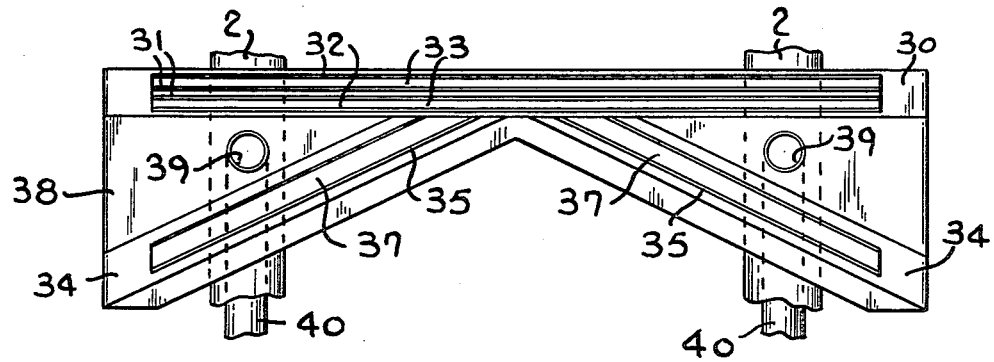
FIG. 5 is a detailed elevation view of the stationary part of the cutting device.
Figures 9, 10, 11:
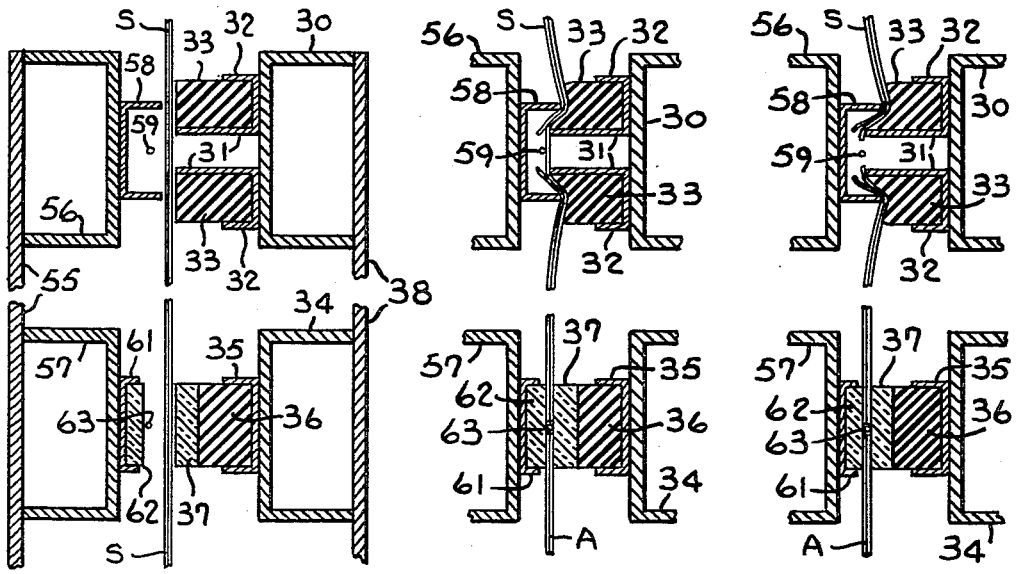
FIG. 9 is a detailed vertical sectional view taken on the line 9—9 of FIG. 1 through the cutting device in its open position.
FIGS. 10 and 11 are views similar to FIG. 9 showing the parts in other positions to indicate the cutting action.

Referring to FIGS. 5 and 9, the stationary part of the cutting apparatus includes a metal base member 30, a pair of spaced metal channels or abutments 31 secured to the base having their outer sides 32 of less length than their inner sides, and a pair of yieldable pads 33 of rubber or other suitable yieldable material mounted in said channels to form a backing for the stock where the transverse cut is to be made. The cutting apparatus also includes metal base members 34, each having a metal channel 35 secured thereto to form a mounting for a backing pad comprising a yieldable pad 36 of rubber or other suitable material having a face 37 of glass or other suitable heat insulating material. The bases 34 and their associated pads extend at an angle to the base 30 and its pad and meet the same short of the central portion of the base 30 to provide a gap which forms a part of the transverse cut by which the aforesaid bag is severed from the tubular stock. The base members 30 and 34 are mounted on a common base plate 38 secured to the standards and provided with spaced openings 39 communicating with waste pipes 40 that lead to a waste box 41 secured to the standards below the cutting apparatus. As shown in FIG. 4, the suction end of the box 41 is separated from the rest of the box by a screen 42, the box having a clean-out opening 43 provided with a removable cover 44.

Subatmospheric pressure is established in the box 41 by opening a butterfly valve 45 in a suction pipe 46. The valve 45 has an exteriorly disposed operating arm 47 connected by a pin 48 to the outer end of a piston 49 working in a cylinder 50 supplied with compressed air by a branch pipe 51 having an adjustable throttling valve 52 therein to control the timing of the operation of the piston. Cylinder 50 has an air vent 53 to limit the travel of the piston 49 to its valve opening position, said piston being returned by a spring 54, see FIG. 23.

Figure 6:
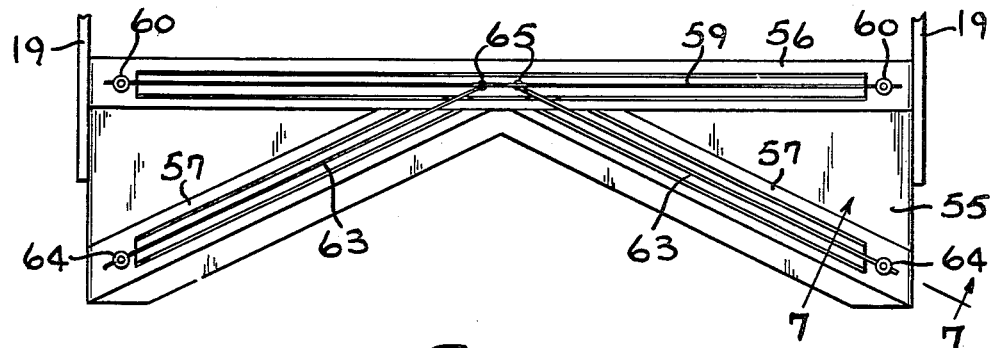
FIG. 6 is a detailed elevation view of the movable part of the cutting device.

Referring to FIGS. 6 and 9, the movable part of the cutting apparatus includes a base plate 55, base members 56 and 57 mounted on plate 55 and forming the counterparts of base members 30 and 34. The base member 56 has a metal channel member 58 whose web is secured to said base member, the flanges of said channel being spaced apart to overlap or embrace the inner sides of the channels 31 as shown in FIGS. 10 and 11 so that when the edges of the flanges of the channel 58 engage the stock and force it toward the stationary part, the stock will be pressed into the pads 33 and at the same time drawn taut over to the outer edges of the longer sides of the channels 31 so as to tension the stock bridging these channels. A hot cutting wire 59 is strung between stationary binding posts 60 and extends parallel to the base and lengthwise of the channel 58 just back of the outer edges of the flanges of this channel as indicated in FIG. 9. This wire acts to sever the desired length of stock from the remainder thereof.

Figure 7:
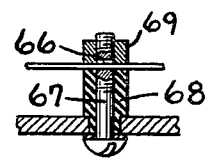
FIG. 7 is a detailed vertical sectional view taken on the line 7—7 of FIG. 6 of one of the hot wire terminals.
Figure 8:
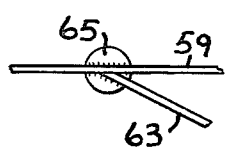
FIG. 8 is an enlarged elevation view of another of the hot wire terminals.

Each base member 57 has metal channels 61 secured thereto in the same angular relation as the channels 35, and each channel 61 has a glass block or pad 62 mounted therein. A hot cutting wire 63 extends lengthwise of and medially of the outer face of each pad 62, each wire being strung between an outer binding post 64 and an inner post 65. The posts 65 are spaced apart to provide a gap and also have portions of the wire 59 mounted therein, these wires at their junction points being welded or otherwise suitably connected to the posts as indicated in FIG. 8. The binding posts 60 and 64 may be of the type shown in FIG. 7 in which the wire passes through an opening 66 in a bolt 67 mounted in a tubular support 68 of insulating material and carrying a nut 69 for clamping the wire between it and the outer end of the support 68.

Referring to FIG. 22, 110 volt electric current wires 69 and 70 have the primary of a low voltage transformer T connected across the same, the secondary of the transformer having conductors 71 and 72 connected thereto. Conductor 71 has branch conductors 73 connected to binding poses 60 at the opposite ends of the wire 59, and is also connected by branch conductors 74 with posts 64 at the outer ends of the wires 63. The spaced posts 65 to which the inner ends of the wires 63 are connected, are connected by a conductor 75 with the conductor 72 so that when the hand switch 76 is closed, the wires 59 and 63 will become hot to cut and/or cut and seal the tubular stock when the same is contacted by the hot wires. The line wires 69 and 70 supply current to switches 77 and 78. These switches are actuated by a solenoid, the plunger of which responds to energization of the solenoid which occurs when a pedal operated switch K is closed, this switch being connected in the energizing circuit for the solenoid which includes conductor 72 and a branch conductor 80 connected with conductor 71.

The switches 77 and 78 are adapted to engage contacts connected to conductors 81 and 82 which in turn are connected to the input side of a rectifier R. The output side of the rectifier is connected by conductors 83 and 84 to the terminals of an electric motor M. The switches 77 and 78 are also adapted to engage contacts connected to conductors 85 and 86 which respectively connect with the motor supply conductors 83 and 84 beyond the rectifier. The motor is of the type which runs on alternating current but which will be stopped when direct current is supplied thereto. With switch 76 closed, and the switches 77 and 78 being in the position shown in FIG. 22 to connect the rectifier with the current supply, direct current is supplied to the motor so that it does not operate. When the foot pedal controlling switch K is depressed, the coil of the solenoid is energized and plunger 79 shifts switches 77 and 78 to connect the supply with conductors 85 and 86, and the motor is operated to rotate the shaft 4 to feed off stock from the supply roll S.

The switch K is arranged to be closed on depression of the foot pedal 87. The air valve 28 is opened by the depression of foot pedal 88, and the air valve 14 is closed by depression of the foot pedal 89.

The cycle of events in forming a bag is as follows: The valve 14 being normally open, the piston rod 9 is in its upper position and a hanger 11 with the garment G thereon is thus hung from the notch 10 as shown in FIG. 12. The operator then presses down on pedal 87 to close switch K and thus connect the motor M with its alternating current supply so that the shaft 4 is turned by the motor to feed stock off the roll S down through the spaced apart parts of the cutting apparatus. As the stock feeds down, it is opened up by the operator with the aid of the air jet as indicated in FIG. 16 so that it will pass over the garment G and will move down to the position shown in FIG. 13, at which time the pedal 87 is released, thereby opening switch K and stopping the motor M. The pedal 88 is now depressed to open valve 28 and admit compressed air from supply pipe 12, to the cylinders 24. The pistons 23 thus rise and cause the triangular plates or levers 19 to move plates 55 and 38 relative to each other to clamp the stock between them. This clamping action forces the stock against the yielding pads 33 and 36, and facing surface 37 and as previously described tensions that portion of the stock which is to receive the transverse cut between the channels 31 by the clamping of the stock between the channel 58 and the pads 33.

With the stock thus clamped, further inward movement of the channel 31 brings the hot wire 59 into contact with the stock, and as it sears its way through the first layer of the stock, this layer breaks apart as shown in the upper view of FIG. 10. The hot wire then contacts the second layer and sears its way through it, and as it does, this second layer breaks apart as shown in the upper view of FIG. 11, whereupon the lower portion of the stock is severed from the remainder without sealing the severed layers of the remainder of the stock. At the same time the stock is also clamped between the pads 33 and the facing surface 37 of pad 36 under yielding pressure, and the wires 63 cut through the plies of the stock and melt their edge portions together to seal them as indicated in FIGS. 10 and 11.

Directly after the cuts above described are made, the piston rod member 49 is operated to swing arm 47 down and open valve 45 in the suction line 46. The resulting subatmospheric pressure in the box 41 and pipes 40 sucks the cut end portions A of the stock, indicated in FIG. 14, into the box 41. Adjustment of the valve 52 determines the timing of this suction apparatus.

FIG. 17 and FIGS. 18 to 21 and 26 show the effect of the operation of the cutting apparatus as above described on the stock. FIG. 26 shows the open condition of the lower severed end of the tubular stock, and FIG. 19 shows that the portion of the bag at the gap between the posts 65 and through which the hook portion of the hanger extends is also open while FIGS. 18 and 20 show that the upper inclined portions of the bag B are sealed together. On the release of the pedal 88 the formed bag B is lowered down over the garment as shown in FIG. 14. To move the bag covered garment from the apparatus, the operator presses down on the pedal 89 to close the valve 14 so that the pistons 8, 9 can move down of its own weight to its lowered position shown in FIG. 15 while the operator holds the covered garment, and then the operator may readily remove the covered garment and place it on a rack or a conveyor for subsequent handling.

What I claim as my invention is:

1. In an apparatus for cutting thermoplastic tubular stock, the combination of: a pair of relatively movable stock clamping members, one of said members having a pair of spaced abutments and yieldable pads adjacent to said abutments; means on the other of said clamping members for drawing a portion of the stock over said abutments while forcing other portions adjacent thereto against said pads to tension a portion of the stock bridging said abutments, said last named clamping member having a heated wire for successively engaging and individually cutting overlying parts of the tensioned stock bridging said abutments; and means for moving said clamping members relative to each other.

2. A machine for fabricating a plastic garment covering about a garment to be covered comprising a hanger support on which the garment to be covered is adapted to be hung, means for supporting a supply of heat-sealable plastic tubular stock adjacent said hanger support for permitting the end of said tubular stock to be pulled from said supply down over a garment hung on said hanger support, means for simultaneously severing and heat sealing opposite wall portions of the tubular stock along lines extending from transversely spaced-apart midpoints outwardly and downwardly through to the opposite side edges of the tubular stock to form a bag sealed at one end with a medial hanger slot therein, and means for transversely severing said tubular stock completely detach the formed bag therefrom.

3. A machine for fabricating a garment covering about a garment to be covered comprising a hanger support on which the garment to be covered is adapted to be hung, means for supporting a supply of heat-sealable tubular stock adjacent to said hanger support for permitting the end of said tubular stock to be pulled from said supply down over a garment hung on said hanger support, means for heat sealing opposite wall portions of the tubular stock along lines extending from transversely spaced-apart midpoints outwardly and downwardly through the opposite side edges of the tubular stock to form a bag sealed at one end with a medial hanger slot therein, and means for transversely severing said tubular stock to completely detach the formed bag therefrom.

4. In an apparatus for cutting a length of tubular thermoplastic stock from a flat web thereof and forming the same into a bag, the combination of: a pair of relatively movable clamping members to grip the web of tubular stock; a hot wire carried by one of said clamping members in position to cut transversely through the web of tubular stock as the clamping members grip the web; other hot wires carried by said clamping member, said other hot wires having inner ends contiguous to the first hot wire near the center thereof but spaced from one another, and diverging from said other wire to also cut through the tubular stock but at the same time heat-seal the overlying sides of the tubular stock; means operable in consequence of movement of the clamping members into gripping engagement with the web of stock to tension the stock in the region engaged by said first hot wire so that as said wire cuts through the overlying sides of the web the edges of the cut are pulled apart to assure that the end of the web of tubular stock will be left open and an opening will be left between the inner ends of the heat-sealed portions formed by said divergent other hot wires; and means for moving the clamping members into gripping relation with the web of stock.

5. The apparatus of claim 4, wherein the cuts made by said first and second wires result in waste pieces of stock, and further characterized by a waste receiving chamber having a mouth in juxtaposition to the hot wires; and means for connecting said chamber with a source of suction so that the waste pieces are drawn into the mouth of the chamber.

6. In an apparatus for forming garment bags over garments, from a web of tubular stock, the combination of: a frame; means on the frame to rotatably support a roll of the tubular stock; an electric motor for rotating said roll of stock to feed the web of stock over the garment to be covered; means to connect the motor with a source of power including a pedal operated switch; a pair of web gripping clamping members; hot wires on one of said clamping members, one of said hot wires being positioned to cut transversely entirely across the web stock and others of said hot wires being positioned to cut and heat seal the edges of the cuts made thereby, at divergent angles with the inner ends of the divergent heat-sealed cuts spaced from one another but contiguous to the transverse cut; cooperating means on the clamping members for tensioning the web of stock in the region thereof contacted by the hot wire which cuts transversely entirely across the web, as the clamping members grip the web, so that the edges of the transverse cut do not heat-seal together; and means for moving said clamping members relative to one another to effect the cutting and sealing operation.

7. The structure as defined in claim 6, wherein means are provided for removing waste cut from the stock during the cutting operation, said means being rendered operable directly after the cutting operation.

8. A garment bagging machine to form garment bags from a web of heat sealable tubular stock drawn from a roll thereof, the web comprising two superimposed elongated sheets joined together at their longitudinal edges, said machine comprising: a frame; means to rotatably support the roll of stock on said frame; means to support a garment hanger with a garment draped thereon in position to have the web of tubular stock pulled down over the garment to envelope the same, the length of stock enveloping the garment defining a bag section; upper and lower web clamping means, the upper web clamping means being arranged to clamp the web of tubular stock along spaced apart lines extending transversely across the web to maintain the web taut between said lines; a heating element associated with said upper web clamping means and operable to engage and sear through the taut web portion across the entire width of the web to thereby sever the bag section from the web without sealing the two superimposed sheets of the web to one another; and heat sealing means associated with said lower web clamping means to engage the portion of the web gripped by said lower web clamping means and thereby heat-seal the two superimposed sheets of the web to one another above the shoulders of the garment enveloped by the bag section.

9. A machine for fabricating a plastic garment covering about a garment to be covered, comprising: a hanger support on which a garment hanger with a garment draped thereon is adapted to be hung; means for supporting a supply of heat-sealable plastic tubular stock adjacent to said hanger support with the end of the tubular stock in position to be pulled down over a garment hung on said hanger support; means for heat sealing the opposite wall portions of the tubular stock along lines extending from transversely spaced mid-points outwardly towards and to the opposite side edges of the tubular stock to form an inverted bag with a medial hanger slot in its upper end; and means for transversely severing the thus formed inverted bag from the remainder of the tubular stock.

10. A machine for fabricating a covering about a garment, comprising: a hanger support on which the garment to be covered is adapted to be hung; means for supporting a supply of heat sealable tubular stock adjacent to said hanger support in position to be pulled down over a garment hung on said hanger support; means for simultaneously severing and heat sealing the opposite wall portions of the tubular stock along lines extending from transversely spaced mid-points outwardly towards and to the opposite side edges of the tubular stock to form an inverted bag with a medial hanger slot in its upper end; and means for severing the formed inverted bag from said tubular stock.

11. A method of forming a garment bag of heat-sealable material about a garment, which comprises the steps of: hanging the garment draped over a garment hanger on an upright supporting member; providing a tubular web of heat-sealable material having overlying walls joined at their side edges; supporting said tubular web with an open end portion thereof hanging down and substantially in line with the garment; effecting relative vertical movement between the garment and the tubular web to thereby cause the garment to be enveloped by the tubular web; heat sealing the overlying walls of the tubular web to one another above the shoulder portions of the garment and along upwardly converging lines with the seals extending from the side edges of the web to points spaced from the centerline of the web, to thus form an inverted bag having a hole in its upper end to accommodate the hook of the hanger; gripping the tubular web along parallel lines transverse to the web and above and below but close to the inner extremities of said seals, and stretching the portion of the web between said parallel lines; and melting the stretched portion of the tubular web along a path which lies between said parallel lines and substantially passes through the inner extremities of said seals, to thus sever the inverted bag from the web without sealing shut the end of the tubular web.

12. The method of claim 11, wherein the step of sealing the overlying walls of the tubular web to one another also cuts through the web along said seals, so that the melting of the stretched portion of the web, in addition to severing the inverted bag from the web, also results in waste pieces; and sucking said waste pieces as they are produced, into a receptacle.

13. A method of forming a garment bag from heat sealable open ended tubular stock comprising the steps of: heat sealing said stock along two shoulder lines angularly inclined relative to the axis of the stock and each extending inwardly from an outer edge of the stock towards one another, each shoulder line terminating on the same transverse axis of the stock in spaced relation from one another and from the center line to define an unsealed central portion of the stock between the inner terminal points of the two shoulder lines, tautly holding a segment of said stock, melting said stock transversely of its longitudinal axis along a line extending across the tautly held segment closely adjacent the inner terminal points of said shoulder lines, and severing from the stock the unsealed portions thereof disposed between said shoulder lines and said transverse cut line.

14. The garment bagging machine of claim 8, wherein said upper clamping means is provided with upper and lower clamping faces disposed respectively above and below said heating element.

References Cited in the file of this patent

UNITED STATES PATENTS

| | | |
|---|---|---|
| 1,792,161 | Gygi | Feb. 10, 1931 |
| 2,185,647 | Penn et al. | Jan. 2, 1940 |
| 2,200,971 | Sonneborn et al. | May 14, 1940 |
| 2,289,618 | Young | July 14, 1942 |
| 2,294,220 | Albertson | Aug. 25, 1942 |
| 2,363,442 | Scott | Nov. 21, 1944 |
| 2,382,930 | Williams | Aug. 14, 1945 |
| 2,479,552 | Blessing | Aug. 23, 1949 |
| 2,547,836 | Pfeiffer | Apr. 3, 1951 |
| 2,594,804 | Ringel | Apr. 29, 1952 |
| 2,609,983 | Denton | Sept. 9, 1952 |
| 2,627,213 | Nye | Feb. 3, 1953 |
| 2,649,672 | Thompson | Aug. 25, 1953 |
| 2,673,495 | Hecker et al. | Mar. 30, 1954 |
| 2,679,280 | Marsh | May 25, 1954 |
| 2,725,699 | Rumsey | Dec. 6, 1955 |
| 2,740,740 | Binnall | Apr. 3, 1956 |
| 2,741,885 | Allison | Apr. 17, 1956 |
| 2,771,534 | Schwahn | Nov. 20, 1956 |
| 2,800,163 | Rusch | July 23, 1957 |
| 2,805,973 | Klasing et al. | Sept. 10, 1957 |